United States Patent [19]

Hara

[11] Patent Number: 4,956,870
[45] Date of Patent: Sep. 11, 1990

[54] PATTERN SELECTING DEVICE CAPABLE OF SELECTING FAVORABLE CANDIDATE PATTERNS

[75] Inventor: Masanori Hara, Tokyo, Japan

[73] Assignee: NEC Corporation, Tokyo, Japan

[21] Appl. No.: 442,281

[22] Filed: Nov. 28, 1989

[30] Foreign Application Priority Data

Nov. 29, 1988 [JP] Japan ................................ 63-299434

[51] Int. Cl.$^5$ .............................................. G06K 9/00
[52] U.S. Cl. ............................................ 382/30; 382/4;
382/36; 381/43
[58] Field of Search ...................... 382/3, 4, 30, 34, 36;
381/43

[56] References Cited

U.S. PATENT DOCUMENTS 3,492,646 4/1965 Bene et al. ............................ 382/30

Primary Examiner—Leo H. Boudreau
Assistant Examiner—Daniel Santos
Attorney, Agent, or Firm—Foley & Lardner, Schwartz, Jeffery, Schwaab, Mack, Blumenthal & Evans

[57] ABSTRACT

In a pattern selecting device for use in combination with a pattern collating device for collating an input pattern with a plurality of registered patterns to produce first through N-th candidate pattern signals indicative of first through N-th candidate patterns which have first through N-th candidate degrees of similarity relative to the input pattern, where N represents an integer which is not less than two and is not greater than the number of the registered patterns, a processing unit processes (n+1)-th through the N-th candidate pattern signals and produces an approximation signal representative of an approximation variable related to (n+1)-th through the N-th candidate degrees, where n is variable from 1 toward N. An estimating unit estimates an n-th estimated degree for an n-th candidate pattern with reference to the approximation variable to produce an estimated signal representative of the n-th estimated degree. A deciding unit decides whether or not a ratio of the n-th estimated degree to the n-th candidate degree is not smaller than a predetermined value and produces an output numeral representative of n-th candidate pattern when the ratio is not smaller than the predetermined value. Instead of the ratio, it is possible to use a weighted mean value of the n-th candidate degree and the ratio of the n-th estimated degree to the n-th candidate degree.

8 Claims, 3 Drawing Sheets

PATTERN SELECTING DEVICE CAPABLE OF SELECTING FAVORABLE CANDIDATE PATTERNS

BACKGROUND OF THE INVENTION

This invention relates to a pattern selecting device for selecting few favorable candidate patterns from a plurality of candidate patterns. Such a pattern selecting device is particularly useful in a fingerprint search system for a criminal investigation.

A fingerprint search system uses a fingerprint collating device in collating an input fingerprint pattern with a plurality of registered fingerprint patterns. The fingerprint collating device successively produces first through N-th candidate pattern signals indicative of first through N-th candidate patterns where N represents an integer which is not less than two and is not greater than the number of the registered fingerprint patterns. In a descending order, the first through the N-th candidate pattern signals represent candidate degrees of similarity relative to the input fingerprint pattern. The number N is determined according to the type of the fingerprint collating device in the manner which will be described below.

A first type of the fingerprint collating device always produces the candidate pattern signals with a constant number used as the integer N. The integer N is, for example, equal to ten. Such a fingerprint collating device is called a fixed-number type.

In a second type of the fingerprint collating device, the number N is determined in accordance with the degree of similarity. Namely, the fingerprint collating device produces the candidate pattern signals having the candidate degrees which are not smaller than a predetermined value. Such a fingerprint collating device is called a fixed-similarity type.

After the first through the N-th candidate pattern signals are decided by the fingerprint collating device, an operator uses the fingerprint search system in visually comparing the input fingerprint pattern with the first through the N-th candidate patterns to detect an objective pattern which coincides with the input fingerprint pattern.

In the fixed-number type described above, a heavy work load is required on comparing the input fingerprint pattern with the first through the N-th candidate patterns no matter whether or not the objective pattern is included in the registered fingerprint patterns. This means that the operator must repeat invalid comparing operation if the objective pattern does not exist in the registered fingerprint patterns.

In the fixed-similarity type, the fingerprint collating device produces a reduced number of candidate pattern signals if the predetermined value is set at a large value. In this event, the work load of the operator is reduced. However, the objective pattern may be excluded from the candidate patterns because the input fingerprint pattern may comprise an obscure part so that none of the candidate patterns cannot get higher degree of similarity than the predetermined value.

SUMMARY OF THE INVENTION

It is therefore an object of this invention to provide a pattern selecting device which is capable of selecting favorable candidate patterns.

It is another object of this invention to provide a pattern selecting device of the type described, which is capable of reducing work load of an operator for comparing operation.

On describing the gist of this invention, it is possible to understand that a pattern selecting device is for producing an output numeral indicative of one of first through N-th candidate patterns which have first through N-th candidate degrees of similarity relative to an input pattern and are decided by a pattern collating system for collating the input pattern with a plurality of registered patterns to produce, successively in a descending order of the first through the N-th candidate degrees, first through N-th candidate pattern signals representative of the first through the N-th candidate patterns, where N represents an integer which is not less than two and is not greater than the number of the registered patterns.

According to this invention, the above-understood pattern selecting device comprises processing means for processing the first through the N-th candidate pattern signals to produce, when an (n+1)-th candidate pattern signal is processed, where n is variable from 1 towards N, an n-th processed signal related to the (n+1)-th through the N-th candidate degrees. The pattern selecting device further comprises estimating means connected to the processing means for estimating an n-th estimated degree for an n-th candidate pattern with reference to the processed signal to produce an estimated signal representative of the n-th estimated degree, and deciding means connected to the processing means and the estimating means for deciding whether or not a ratio of the n-th estimated degree to the n-th candidate degree is not smaller than a predetermined value. The deciding means thereby produces a numeral indicative of the n-th candidate pattern as the output numeral.

In connection with the gist described above, the deciding means may decide one of the candidate patterns as a favorable pattern for which the ratio is not smaller than the predetermined value. In this event, the pattern selecting device produces that one of the candidate patterns rather than the output numeral. Furthermore, the first through the N-th candidate pattern signals may be produced with first through N-th degrees of dissimilarity arranged in an ascending order between the input pattern and the first through the N-th candidate patterns. In this latter event, the deciding means should decide whether or not the ratio is not greater than a preselected value. It should be noted that such pattern selecting device are equivalents of the pattern selecting device set forth in the gist of this invention.

DESCRIPTION OF THE PREFERRED EMBODIMENT

Figure 1:
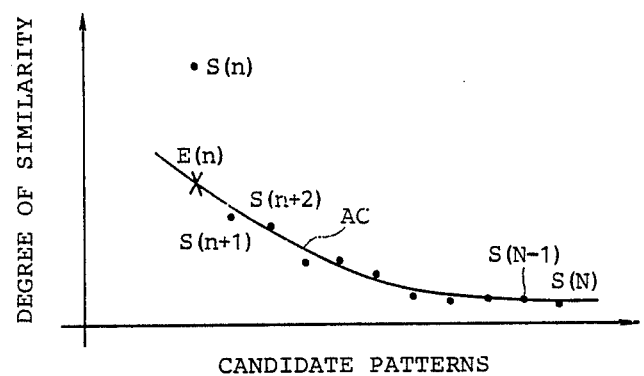
FIG. 1 shows a curve for use in describing a relationship between a degree of similarity for some of candidate patterns.

Referring to FIG. 1, principles of the present invention will be described at first. It will be assumed that a pattern collating device collates an input pattern with a plurality of registered patterns and successively produces first through N-th candidate signals indicative of first through N-th candidate patterns, where N represents an integer which is not less than two and is not greater than the number of the registered patterns. The first through the N-th candidate signals represent, in a descending order, first through N-th candidate degrees of similarity between the input pattern and the registered patterns. An n-th through the N-th candidate degrees are depicted at $S(n)$, $S(n+1)$, $S(n+2)$, ..., $S(N-1)$, and $S(N)$, where n is variable from 1 towards N. As depicted at AC, an approximation curve can be obtained by the use of a least square approximation method and is related to the $(n+1)$-th through the N-th candidate degrees. An n-th estimated degree for an n-th candidate pattern is depicted at $E(n)$ and can be estimated with reference to the approximation curve AC. A ratio of the n-th estimated degree to the n-th candidate degree represents a probability that the n-th candidate pattern is regarded as an objective pattern which coincides with the input pattern. In the example being illustrated, the n-th candidate pattern is characterized by a higher ratio as compared with the $(n+1)$-th through the N-th candidate patterns. The n-th candidate pattern should therefore be regarded as a favorable candidate pattern.

Figure 2:
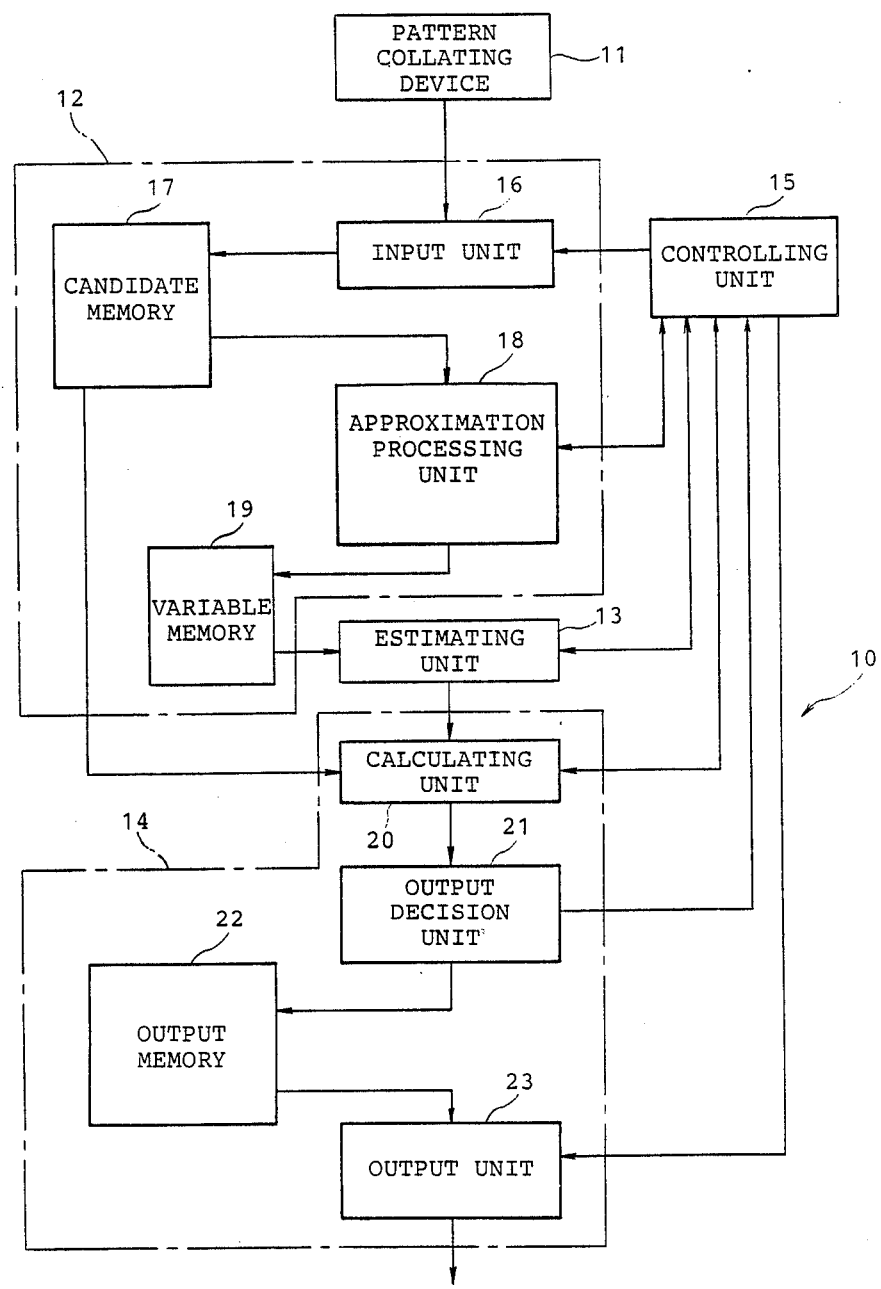
FIG. 2 is a block diagram of a pattern selecting device according to an embodiment of this invention.

Referring to FIG. 2, the description will proceed to a fingerprint pattern selecting device according to a preferred embodiment of this invention. The fingerprint pattern selecting device, depicted at 10, is of the type which is for use in combination with a fingerprint pattern collating device of a fixed-number type described heretobefore. The fingerprint pattern collating device is depicted at 11 and is for collating an input fingerprint pattern with a plurality of registered fingerprint patterns in the manner known in the art. The fingerprint pattern collating device 11 successively produces first through N-th candidate pattern signals indicative of first through N-th candidate patterns which have, in a descending order, first through N-th candidate degrees of similarity relative to the input fingerprint pattern. The first through the N-th candidate pattern signals are delivered to the fingerprint pattern selecting device 10.

The fingerprint pattern selecting device 10 is for selecting a plurality of favorable patterns as selected candidate patterns from the first through the N-th candidate patterns and produces an output numeral signal representative of numerals of the selected candidate patterns. The pattern selecting device 10 comprises a processing unit 12, an estimating unit 13, a deciding unit 14, and a controlling unit 15 for controlling the processing unit 12, the estimating unit 13, and the deciding unit 14.

The processing unit 12 comprises an input unit 16 and a candidate memory 17. On reception of an input instruction signal from the controlling unit 15, the input unit 16 supplies the first through the N-th candidate pattern signals to the candidate memory 17. The candidate memory 17 memorizes the first through the N-th candidate pattern signals as first through N-th memorized candidate signals. Supplied with a process starting signal from the controlling unit 15, an approximation processing unit 18 reads the $(n+1)$-th through the N-th memorized candidate signals out of the candidate memory unit 17, where n represents a starting numeral and is variable from 1 towards N. In a manner which will later be described, the approximation processing unit 18 processes the $(n+1)$-th through the N-th memorized candidate signals. When the approximation processing unit 18 completes its operation, the approximation processing unit 18 supplies a variable memory 19 with an approximation signal representative of an n-th approximation variable related to the $(n+1)$-th through the N-th candidate degrees. The variable memory 19 memorizes the approximation signal as a memorized approximation signal. Subsequently, the approximation processing unit 18 delivers a process completion signal to the controlling unit 15.

On reception of the process completion signal, the controlling unit 15 supplies an estimation starting signal to the estimating unit 13. Supplied with the estimation starting signal, the estimating unit 13 reads the memorized approximation signal out of the variable memory 19 as a readout approximation signal and estimates an n-th estimated degree $E(n)$, depicted in FIG. 1, for the n-th candidate pattern with reference to the readout approximation signal. The estimating unit 13 delivers an estimation completion signal to the controlling unit 15 on completion of estimating operation and produces an estimated signal representative of the n-th estimated degree $E(n)$.

The deciding unit 14 comprises a calculating unit 20 supplied with the estimated signal. The controlling unit 15 supplies a calculation starting signal to the calculating unit 20 in response to the estimation completion signal. Supplied with the estimation completion signal, the calculating unit 20 reads the n-th memorized candidate signal as an n-th readout candidate signal representative of the n-th candidate degree $S(n)$ and calculates an n-th ratio $R(n)$ of the n-th estimated degree to the n-th candidate degree. On completion of calculating operation, the calculating unit 20 delivers a calculation completion signal to the controlling unit 15 and supplies a calculated signal representative of the n-th ratio $R(n)$ to an output decision unit 21. Supplied with the calculated signal, the output decision unit 21 decides whether or not the n-th ratio $R(n)$ is not smaller than a predetermined value. On completion of deciding operation, the output decision unit 21 delivers a decision completion signal to the controlling unit 15. When the n-th ratio $R(n)$ is not smaller than the predetermined value, the output decision unit 21 produces a numeral signal which represents the starting numeral n. The numeral signal is supplied to an output memory 22. The output memory 22 memorizes the numeral signal as memorized numeral signal. Under the control of the controlling unit 15, each of the processing unit 12, estimating unit 13, and the deciding unit 14 continues the above-described operation until the starting numeral n becomes equal to a predetermined number. When the integer N is, for example, equal to 100, the predetermined number may be set at ten. Subsequently, the controlling unit 15 delivers an output instruction signal to an output unit 23. Supplied with the output instruction signal, the output unit 23 reads the memorized numeral signal out of the output memory 22 as a readout numeral signal and produces the readout numeral signal.

It is to be noted here that the output decision unit 21 produces the numeral signal when the ratio is not smaller than the predetermined value even if the input fingerprint pattern comprises an obscure part. This means that the pattern selecting device according to this invention is not subjected to the influence of the obscure part of the input fingerprint pattern.

Figure 3:
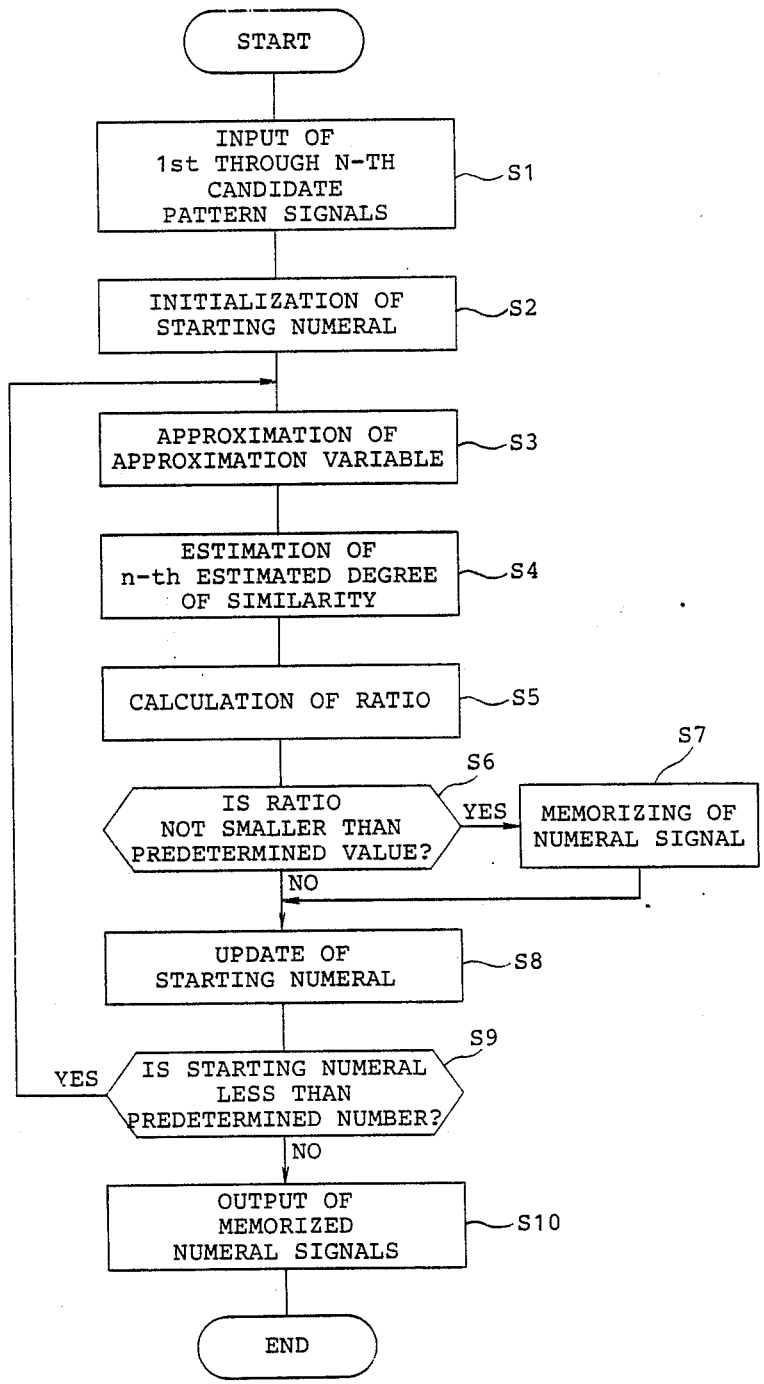
FIG. 3 is a flow chart for use in describing operation of the pattern selecting device illustrated in FIG. 1.

Referring to FIG. 3 in addition to FIG. 2, the description will proceed to operation of the pattern selecting device. The operation proceeds under the control of the controlling unit 15. It will be assumed that the first through the N-th candidate degrees are monotonously decreasing.

At a first step s1, the input unit 16 supplies the first through the N-th candidate pattern signals to the candidate memory 17. The candidate memory 17 memorizes the first through the N-th candidate pattern signals.

At a second step s2, the starting numeral n is set at one.

At a third step s3, the approximation processing unit 18 processes the second through the N-th memorized candidate pattern signals by the use of the least square approximation method as described before. The approximation processing unit 18 produces a first approximation signal representative of a first approximation variable related to the second through the N-th candidate degrees. Each of such approximation variables is represented by a curve representative of a quadratic polynomial of:

$$y = a_0 + a_1 x + a_2 x^2,$$

where factors $a_0$, $a_1$, and $a_2$ can be obtained by solving a matrix equation given by:

$$\begin{bmatrix} 1 & 1 & \ldots & 1 \\ 1 & 2 & \ldots & N-n \\ 1 & 4 & \ldots & (N-n)^2 \end{bmatrix} \times \begin{bmatrix} 1 & 1 & \ldots & 1 \\ 1 & 2 & \ldots & 4 \\ \vdots & \vdots & & \vdots \\ 1 & N-n & \ldots & (N-n)^2 \end{bmatrix} \times$$

$$\begin{bmatrix} a_0 \\ a_1 \\ a_2 \end{bmatrix} = \begin{bmatrix} 1 & 1 & \ldots & 1 \\ 1 & 2 & \ldots & (N-n) \\ 1 & 4 & \ldots & (N-n)^2 \end{bmatrix} \times \begin{bmatrix} S(n+1) \\ S(n+2) \\ \vdots \\ S(N) \end{bmatrix}$$

The third step s3 now proceeds to a fourth step s4, at which the estimating unit 13 estimates a first estimated degree E(1) by the use of an equation given by:

$$E(n) = a_0 + a_1 n + a_2 n^2.$$

The estimating unit 13 produces a first estimated signal representative of the first estimated degree E(1).

At a fifth step s5, the calculating unit 20 calculates a first ratio of the first estimated degree E(1) to the first candidate degree S(1). The calculating unit 20 produces a first calculated signal representative of the first ratio R(1).

At a sixth step s6, the output decision unit 21 decides whether or not the first ratio R(1) is not smaller than the predetermined value. When the first ratio R(1) is not smaller than the predetermined value, the output decision unit 21 produces a first numeral signal indicative of the first candidate pattern in a seventh step s7.

At an eighth step s8, the starting numeral is changed from one to two. At a ninth step s9, the controlling unit 15 distinguishes whether or not the starting numeral is equal to the predetermined number. If the starting numeral is less than the predetermined number, the ninth step turns back to the third step s3. In the third step s3, the approximation processing unit 18 processes the third through the N-th memorized candidate signals for a second approximation variable and produces a second approximation signal representative of the second approximation variable. In the fourth step s4, the estimating unit 13 estimates a second estimated degree with reference to the second approximation variable and produces a second estimated signal representative of the second estimated degree. Thus, the third through the ninth steps s3 to s9 are repeated until the starting numeral is judged in the ninth step s9 to be equal to the predetermined number. When the starting numeral becomes equal to the predetermined number, the output unit 23 reads the memorized numeral signals out of the output memory 22 as readout numeral signals and produces the readout numeral signals at a tenth step s10.

While this invention has thus far been described only in conjunction with a preferred embodiment thereof, it will readily be possible for those skilled in the art to put this invention into practice in various other manners. For example, the approximation processing unit 18 illustrated in FIG. 2 may use an approximation method which is different from the least square approximation method. In FIG. 2, the calculating unit 20 may calculate a weighted arithmetical mean value Va or a weighted geometrical mean value Vg. The weighted arithmetical mean value Va is calculated in accordance with an equation given by:

$$Va = (W1 \times R(n) + W2 \times S(n))/(W1 + W2),$$

where W1 and W2 represent weighted factors having values between 0 and 1 and experimentally determined. The calculation unit produces a weighted mean value signal representative of the weighted arithmetic mean value Va. The weighted geometrical mean value Vg is calculated in accordance with the following equation:

$$Vg = [R^{W1}(n) + S^{W2}(n)]^{1/(W1+W2)}.$$

What is claimed is:

1. A pattern selecting device for producing an output numeral indicative of one of first through N-th candidate patterns which have first through N-th candidate degrees of similarity relative to an input pattern and are decided by a pattern collating system for collating said input pattern with a plurality of registered patterns to produce, successively in a descending order of said first through said N-th candidate degrees, first through N-th candidate pattern signals representative of said first through said N-th candidate patterns, where N represents an integer which is not less than two and is not greater than said plurality, said pattern selecting device comprising:

processing means for processing said first through said N-th candidate pattern signals to produce, when an (n+1)-th candidate pattern signal is processed, where n is variable from 1 towards N, an n-th processed signal related to said (n+1)-th through said N-th candidate degrees;

estimating means connected to said processing means for estimating an n-th estimated degree for an n-th candidate pattern with reference to said processed signal to produce an estimated signal representative of said n-th estimated degree; and deciding means connected to said processing means and said estimating means for deciding whether or not a ratio of said n-th estimated degree to said n-th candidate degree is not smaller than a predetermined value, said deciding means thereby producing a numeral indicative of said n-th candidate pattern as said output numeral.

2. A similar pattern selecting device as claimed in claim 1, wherein said processing means comprises:

first memory means for memorizing said first through said N-th candidate pattern signals as first through N-th memorized pattern signals;

approximation processing means connected to said first memory means for processing (n+1)-th through said N-th memorized pattern signals to produce an n-th approximation signal representative of an n-th approximation variable related to said (n+1)-th through said N-th candidate degrees;

second memory means connected to said approximation processing means for memorizing said n-th approximation signal as an n-th memorized approximation signal; and supplying means for supplying said n-th memorized approximation signal as said n-th processed signal to said estimating means.

3. A similar pattern selecting device as claimed in claim 2, wherein said decision means comprises:

calculating means connected to said first memory means and said estimating means for calculating said ratio to produce a ratio signal representative of said ratio; and output decision means connected to said calculating means for deciding whether or not said ratio is not smaller than said predetermined value, said output decision means producing an output signal indicative of said n-th candidate pattern when said ratio is not smaller than said predetermined value.

4. A pattern selecting device for producing an output numeral indicative of one of first through N-th candidate patterns which have first through N-th candidate degrees of similarity relative to an input pattern and are decided by a pattern collating system for collating said input pattern with a plurality of registered patterns to produce, successively in a descending order of said first through said N-th candidate degrees, first through N-th candidate pattern signals representative of said first through said N-th candidate patterns, where N represents an integer which is not less than two and is not greater than said plurality, said pattern selecting device comprising:

processing means for processing said first through said N-th candidate pattern signals to produce, when an (n+1)-th candidate pattern signal is processed, where n is variable from 1 towards N, an n-th processed signal related to said (n+1)-th through said N-th candidate degrees;

estimating means connected to said processing means for estimating an n-th estimated degree for an n-th candidate pattern with reference to said processed signal to produce an estimated signal representative of said n-th estimated degree; and deciding means connected to said processing means and said estimating means for deciding whether or not a weighted mean value of said n-th candidate degree and a ratio of said n-th estimated degree to said n-th candidate degree is not smaller than a predetermined value, said deciding means thereby producing a numeral indicative of said n-th candidate pattern as said output numeral.

5. A pattern selecting device as claimed in claim 4, wherein said processing means comprises:

first memory means for memorizing said first through said N-th candidate pattern signals as first through N-th memorized pattern signals;

approximation processing means connected to said first memory means for processing (n+1)-th through said N-th memorized pattern signals to produce an n-th approximation signal representative of an n-th approximation variable related to said (n+1)-th through said N-th candidate degrees;

second memory means connected to said approximation processing means for memorizing said n-th approximation signal as an n-th memorized approximation signal; and supplying means for supplying said n-th memorized approximation signal as said n-th processed signal to said estimating means.

6. A pattern selecting device as claimed in claim 5, wherein said decision means comprises:

calculating means connected to said first memory means and said estimating means for calculating said weighted mean value to produce a mean value signal representative of said weighted mean value;

output decision means connected to said calculating means for deciding whether or not said weighted mean value is not smaller than said predetermined value, said output decision means producing an output signal indicative of said n-th candidate pattern when said weighted means value is not smaller than said predetermined value.

7. A pattern selecting device as claimed in claim 6, wherein said weighted mean value is a weighted arithmetical mean value Va, said calculating means calculating said weighted arithmetical mean value by the use of an equation given by:

$$Va = (W1 \times R(n) + W2 \times S(n))/(W1 + W2),$$

where W1 and W2 represent predetermined factors while R(n) represents a ratio of said n-th estimated degree to said n-th candidate degree, and S(n) represents said n-th candidate degree.

8. A pattern selecting device as claimed in claim 6, wherein said weighted mean value is a weighted geometrical mean value Vg, said calculating means calculating said weighted geometrical mean value Vg by the use of an equation given by:

$$Vg = (R^{W1}(n) \times S^{W2}(n))^{1/(W1+W2)},$$

where W1 and W2 represent predetermined factors while R(n) represents a ratio of said n-th estimated degree to said n-th candidate degree, and S(n) represents said n-th candidate degree.

* * * * *